US006925126B2

United States Patent
Lan et al.

(10) Patent No.: US 6,925,126 B2
(45) Date of Patent: Aug. 2, 2005

(54) DYNAMIC COMPLEXITY PREDICTION AND REGULATION OF MPEG2 DECODING IN A MEDIA PROCESSOR

(75) Inventors: Tse-Hua Lan, Ossining, NY (US); Yingwei Chen, Ossining, NY (US); Zhun Zhong, Croton-on-Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 619 days.

(21) Appl. No.: 09/837,036

(22) Filed: Apr. 18, 2001

(65) Prior Publication Data

US 2002/0154227 A1 Oct. 24, 2002

(51) Int. Cl.[7] .................................................. H04N 7/12
(52) U.S. Cl. ............. 375/240.25; 375/240; 375/240.01; 375/240.12; 375/240.29
(58) Field of Search .......................... 375/240.25, 240, 375/240.01, 240.12, 240.16, 240.29; 382/232; 341/67; 348/469

(56) References Cited

U.S. PATENT DOCUMENTS

| 5,289,276 | A | * | 2/1994 | Siracusa et al. ............. 348/469 |
| 6,011,498 | A | * | 1/2000 | Wittig .......................... 341/67 |
| 6,125,147 | A | * | 9/2000 | Florencio et al. ....... 375/240.29 |
| 6,408,096 | B2 | * | 6/2002 | Tan ............................. 382/232 |

FOREIGN PATENT DOCUMENTS

| EP | 0919952 A1 | 5/1998 | ............. G06T/9/00 |
| EP | 0912063 A2 | 10/1998 | ............. H04N/7/50 |
| WO | WO9912126 | 4/1998 | ............. G06T/9/00 |

* cited by examiner

Primary Examiner—Allen Wong (57) ABSTRACT

A method and system of regulating the computation load of an MPEG decoder in a video processing system are provided. The video processing system processes the header information of a compressed video data stream including a plurality of macroblocks with a motion vector associated therewith. Then, the computation load of each functional block of the MPEG decoder is adjusted according to predetermined criteria; thus, substantial computational overhead is desirably avoided.

27 Claims, 9 Drawing Sheets

| MACROBLOCK TYPE | MACROBLOCK_ QUANT | MACROBLOCK_ MOTION_ FORWARD | MACROBLOCK_ MOTION_ BACKWARD | MACROBLOCK_ PATTERN | MACROBLOCK_ INTRA | VLC |
|---|---|---|---|---|---|---|
| INTRA | | | | | 1 | 1 |
| INTRA, MACROBLOCK_QUANT | 1 | | | | 1 | 01 |

FIG. 4a

| MACROBLOCK TYPE | MACROBLOCK_ QUANT | MACROBLOCK_ MOTION_ FORWARD | MACROBLOCK_ MOTION_ BACKWARD | MACROBLOCK_ PATTERN | MACROBLOCK_ INTRA | VLC |
|---|---|---|---|---|---|---|
| MC, CODED |  | 1 |  | 1 |  | 1 |
| NO MC, CODED |  |  |  | 1 |  | 01 |
| MC NOT CODED |  | 1 |  |  |  | 001 |
| INTRA |  |  |  |  | 1 | 00011 |
| MC, CODED, MACROBLOCK_QUANT | 1 | 1 |  | 1 |  | 00010 |
| NO MC, CODED, MACROBLOCK_QUANT | 1 |  |  | 1 |  | 00001 |
| INTRA, MACROBLOCK_QUANT | 1 |  |  |  | 1 | 000001 |

FIG. 4b

| MACROBLOCK TYPE | MACROBLOCK_ QUANT | MACROBLOCK_ MOTION_ FORWARD | MACROBLOCK_ MOTION_ BACKWARD | MACROBLOCK_ PATTERN | MACROBLOCK_ INTRA | VLC |
|---|---|---|---|---|---|---|
| MC INTERPOLATED, NOT CODED |  | 1 | 1 |  |  | 10 |
| MC INTERPOLATED, CODED |  | 1 | 1 | 1 |  | 11 |
| MC BACKWARD, NOT CODED |  |  | 1 |  |  | 010 |
| MC BACKWARD, CODED |  |  | 1 | 1 |  | 011 |
| MC FORWARD, NOT CODED |  | 1 |  |  |  | 0010 |
| MC FORWARD, CODED |  | 1 |  | 1 |  | 0011 |
| INTRA |  |  |  |  | 1 | 00011 |
| MC INTERPOLATED, CODED MACROBLOCK_QUANT | 1 | 1 | 1 | 1 |  | 00010 |
| MC FORWARD, CODED MACROBLOCK_QUANT | 1 | 1 |  | 1 |  | 000011 |
| MC BACKWARD, CODED MACROBLOCK_QUANT | 1 |  | 1 | 1 |  | 000010 |
| INTRA, MACROBLOCK_QUANT | 1 |  |  |  | 1 | 000001 |

FIG. 4c

MACROBLOCK (MB) COMPLEXITY TABLE

| MB-TYPE | MB-TYPE-INDEX | WEIGHT CODE |
|---|---|---|
| INTRA | 0 0 | 0 |
| NOT MC, CODED | 0 1 | W |
| MC, NOT CODED | 1 0 | 2W |
| MC, CODED | 1 1 | 3W |

DYNAMIC COMPLEXITY PREDICTION AND REGULATION OF MPEG2 DECODING IN A MEDIA PROCESSOR

BACKGROUND OF THE INVENTION

1. Field of the Invention

The present invention relates to video processing of compressed video information, and more particularly, to a method and device for regulating the computation load of an MPEG decoder.

2. Description of Related Art

Video information is typically compressed to save storage space and decompressed in a bit stream for a display. Thus, it is highly desirable to quickly and efficiently decode compressed video information in order to provide motion video. One compression standard which has attained widespread use for compressing and decompressing video information is the Moving Pictures Expert Group (MPEG) standard for video encoding and decoding. The MPEG standard is defined in International Standard ISO/IEC 11172-1, "Information Technology—Coding of moving pictures and associated audio for digital storage media at up to about 1.5 Mbit/s", Parts 1, 2 and 3, First edition Aug. 01, 1993 which is hereby incorporated by reference in its entirety.

In general, a goal of many video systems is to quickly and efficiently decode compressed video information so as to provide motion video. Currently, computation load of processing a frame is not constrained by the decoding algorithm in the MPEG2 decoding processor. However, due to the irregular computation load behavior of MPEG2 decoding, the peak computation load of a frame may exceed the maximum CPU load of a media processor, thereby causing frame drops or unexpected results. As a consequence, when an engineer implements MPEG2 decoding on a media processor, he or she needs to choose a processor that has a performance margin of 40%–50% above the average decoding computation load in order to have a smooth operation in the event that the peak computation load occurs. This type of implementation is uneconomical and creates a waste of resources as the undesirable peak computation load does not occur that frequently. Hence, without complexity prediction or estimation of frame, slice, or macroblock computational loads, it is impossible for video system engineers to regulate the peak computational demands of some MPEG bit streams.

Therefore, there is a need to provide complexity prediction algorithms for an MPEG2 decoder implemented on a media processor.

SUMMARY OF THE INVENTION

The present invention relates to a method and system for improving decoding efficiency of an MPEG digital video decoder system by scaling the decoding of an encoded digital video signal.

The present invention provides a method of regulating the computation load of an MPEG decoder in a video processing system. The method includes the steps of retrieving the header information of the macroblocks in the compressed video data stream whose motion vectors exhibit a magnitude greater than a predetermined threshold value. The method also includes the step of selectively adjusting the computation load of each functional block of the MPEG decoder according to predetermined criteria. As a consequence, substantial computational overhead is desirably avoided.

The present invention relates to a programmable video decoding system, which includes: a variable length decoder (VLD) configured to receive and decode a stream of block-based data packets, wherein the VLD being operative to output quantized data from said decoded data packets; a complexity estimator configured to extract the header information from the block-based data packets and further configured to execute a video complexity algorithms based on the extracted header information; an inverse quantizer coupled to receive the output of the VLD to operatively inverse quantize the quantized data received from the VLD; an inverse discrete cosine transformer (IDCT) coupled to the output of the inverse quantizer for transforming the dequantized data from frequency domain to spatial domain; a motion compensator (MC) configured to receive motion vector data from the quantized data and to generate a reference signal; and, an adder for receiving the reference signal and the spatial domain data from the IDCT to form motion compensated pictures.

BRIEF DESCRIPTION OF THE DRAWINGS

A more complete understanding of the method and apparatus of the present invention may be had by reference to the following detailed description when taken in conjunction with the accompanying drawings wherein:

FIGS. 4 (a)–(c) illustrate the format of the macroblock_type information;

DETAILED DESCRIPTION OF THE EMBODIMENTS

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For the purpose of simplicity and clarity, detailed descriptions of well-known devices, circuits, and methods are omitted so as not to obscure the description of the present invention with unnecessary detail.

Figure 1:
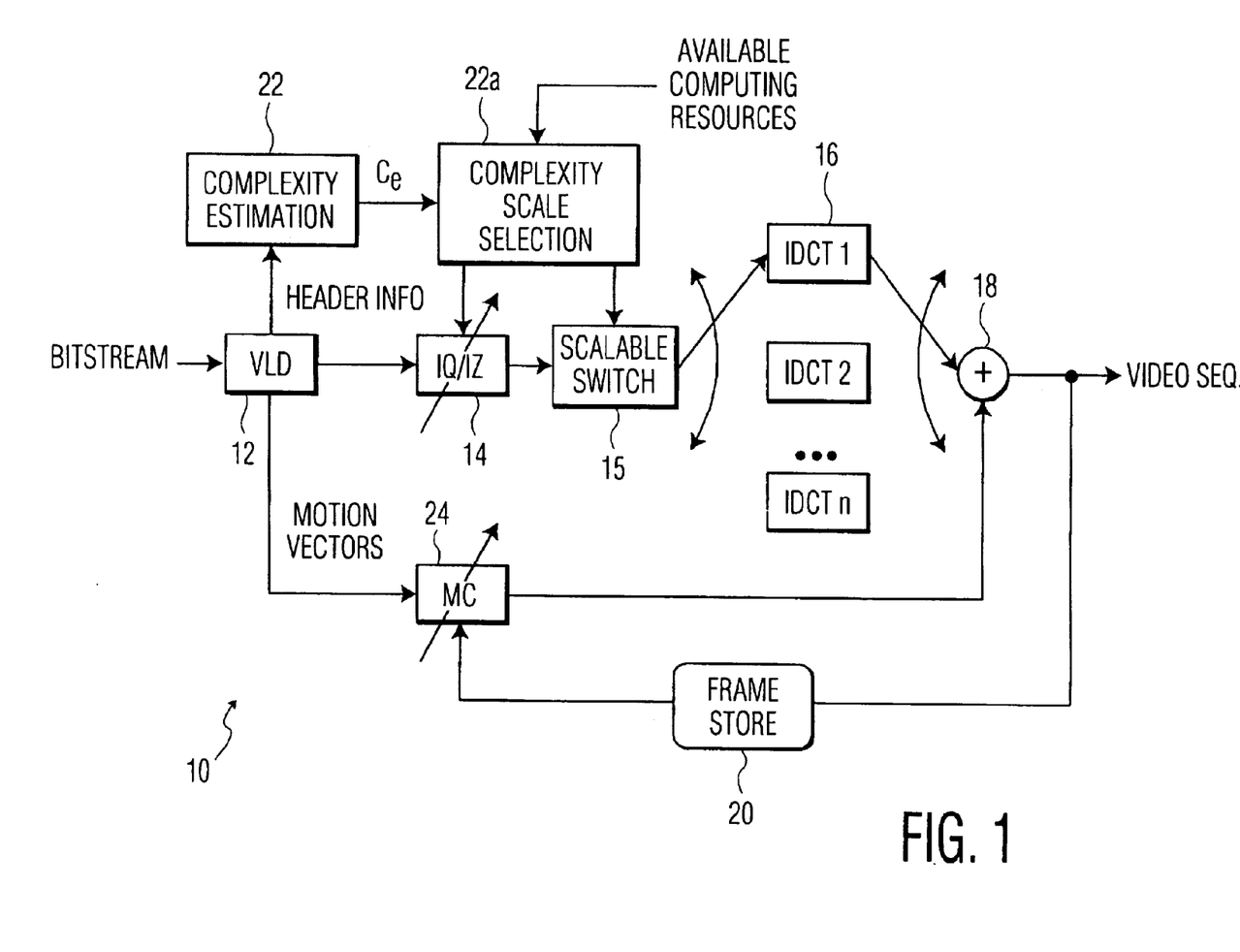
FIG. 1 shows one embodiment of the processor for regulating the computation load in decompressing video information.

FIG. 1 illustrates major components of an MPEG video decoder 10 capable of recovering decoded video samples according to an exemplary embodiment of the present invention. It is to be understood that compression of incoming data is performed prior to arriving to the inventive decoder 10. Compressing video data is well known in the art that can be performed in a variety of ways, i.e., by discarding information to which the human visual system is insensitive in accordance with the standard set forth under the MPEG2 coding process. MPEG2 is a second generation compression standard capable of encoding video programs into a 6 Mbits/sec bit stream and packetizing a number of 6 Mbits/sec channel streams into a single higher rate signal transport stream. Picture elements are converted from spacial information into frequency domain information to be processed.

There are three types of frames of video information which are defined by the MPEG standard, intra-frames (I frame), forward predicted frames (P frame) and bidirectional-predicted frames (B frame). The I frame, or an actual video reference frame, is periodically coded, e.g., one reference frame for each fifteen frames. A prediction is made of the composition of a video frame, the P frame, to be located a specific number of frames forward and before the next reference frame. The B frame is predicted between the I frame and predicted P frames, or by interpolating (averaging) a macroblock in the past reference frame with a macroblock in the future reference frame. The motion vector is also encoded which specifies the relative position of a macroblock within a reference frame with respect to the macroblock within the current frame.

Frames are coded using a discrete cosine transform (DCT) coding scheme, which encodes coefficients as an amplitude of a specific cosine basis function. The DCT coefficients are quantized and further coded using variable length encoding. Variable length coding (VLC)12 is a statistical coding technique that assigns codewords to values to be encoded. Values having a high frequency of occurrence are assigned short codewords, and those having infrequent occurrence are assigned long codewords. On the average, the more frequent shorter codewords dominate so that the code string is shorter than the original data.

Accordingly, upon receiving the compressed coded frames as described above, the decoder 10 decodes a macroblock of a present P frame by performing motion compensation with a motion vector applied to a corresponding macroblock of a past reference frame. The decoder 10 also decodes a macroblock of a B frame by performing motion compensation with motion vectors applied to respective past and future reference frames. Motion compensation is one of the most computationally intensive operations in many common video decompression methods. When pixels change between video frames, this change is often due to predictable camera or subject motion. Thus, a macroblock of pixels in one frame can be obtained by translating a macroblock of pixels in a previous or subsequent frame. The amount of translation is referred to as the motion vector. As the I frame is encoded as a single image with no reference to any past or future frame, no motion processing is necessary when decoding the I frame.

Video systems unable to keep up with the computational demands of the above decompression burden frequently drop entire frames. This is sometimes observable as a momentary freeze of the picture in the video playback, followed by sudden discontinuities or jerkiness in the picture. To this end, the embodiments of FIG. 1 provides complexity prediction for reducing the processing requirements associated with decompression methods, while maintaining the quality of the resulting video image.

Returning now to FIG. 1, the MPEG video decoder 10 according to the present invention for scaling the decoding includes: a variable length decoder (VLC) 12; an inverse scan/quantizer circuit 14; a scalable switch 15; an inverse discrete cosine transform (IDCT) circuit 16; an adder 18; a frame buffer 20; a complexity estimator 22; and, a motion compensation module 24. In operation mode, the decoder 10 receives a stream of compressed video information, which is provided to the VLC decoder 12. The VLC decoder 12 decodes the variable length coded portion of the compressed signal to provide a variable length decoded signal to the inverse scan (or zig-zag)/quantizer circuit 14, which decodes the variable length decoded signal to provide a zig-zag decoded signal. The inverse zig-zag and quantization compensates for the fact that while a compressed video signal is compressed in a zig-zag run-length code fashion. The zig-zag decoded signal is provided to the inverse DCT circuit 16 as sequential blocks of information. This zig-zag decoded signal is then provided to the IDCT circuit 16, which performs an inverse discrete cosine transform on the zig-zag decoded video signal on a block by block basis to provide decompressed pixel values or decompressed error terms. The decompressed pixel values are provided to adder 18.

Meanwhile, the motion compensation module 24 receives motion information and provides motion-compensated pixels to adder 18 on a macroblock by macroblock basis. More specifically, forward motion vectors are used to translate pixels in previous picture and backward motion vectors are used to translate pixels in future picture. Then, this information is compensated by the decompressed error term provided by the inverse DCT circuit 16. Here, the motion compensation circuit 24 accesses the previous picture information and future picture information from the frame buffer 20. The previous picture information is then forward motion compensated by the motion compensation circuit 24 to provide a forward motion-compensated pixel macroblock. The future picture information is backward motion compensated by the motion compensation circuit 24 to provide a backward motion-compensated pixel macroblock. The averaging of these two macroblocks yields a bidirectional motion compensated macroblock. Next, the adder 18 receives the decompressed video information and the motion-compensated pixels until a frame is completed and provides decompressed pixels to buffer 20. If the block does not belong to a predicted macroblock (for example, in the case of an I macroblock), then these pixel values are provided unchanged to frame buffer 20. However, for the predicted macroblocks (for example, B macroblocks and P macroblocks), the adder 18 adds the decompressed error to the forward motion compensation and backward motion compensation outputs from the motion compensation circuit 24 to generate the pixel values which are provided to frame buffer 20.

It should be noted that the construction and operation of the embodiment, as described in the preceding paragraphs, are well known in the art, except that the inventive decoder 10 further includes a complexity estimator 22. The complexity estimator 22 provided in the decoder 10 according to the present invention is capable of providing an estimation of frame, slice, or macroblock computational loads within the decoder 10. Hence, the function of the complexity estimator 22 is to predict the computation load current frame, slice, or macroblock before actually executing MPEG2 decoding blocks (except the VLD operation). With this type of prediction, the present invention allows to design a complexity control mechanism to guarantee a smooth operation of a multimedia system implemented on a media processor. That is, the inventive decoder provides scalability by allowing trade-off between the usage of available computer resources; namely, the IDCT 16 and the MC24.

Figure 2:
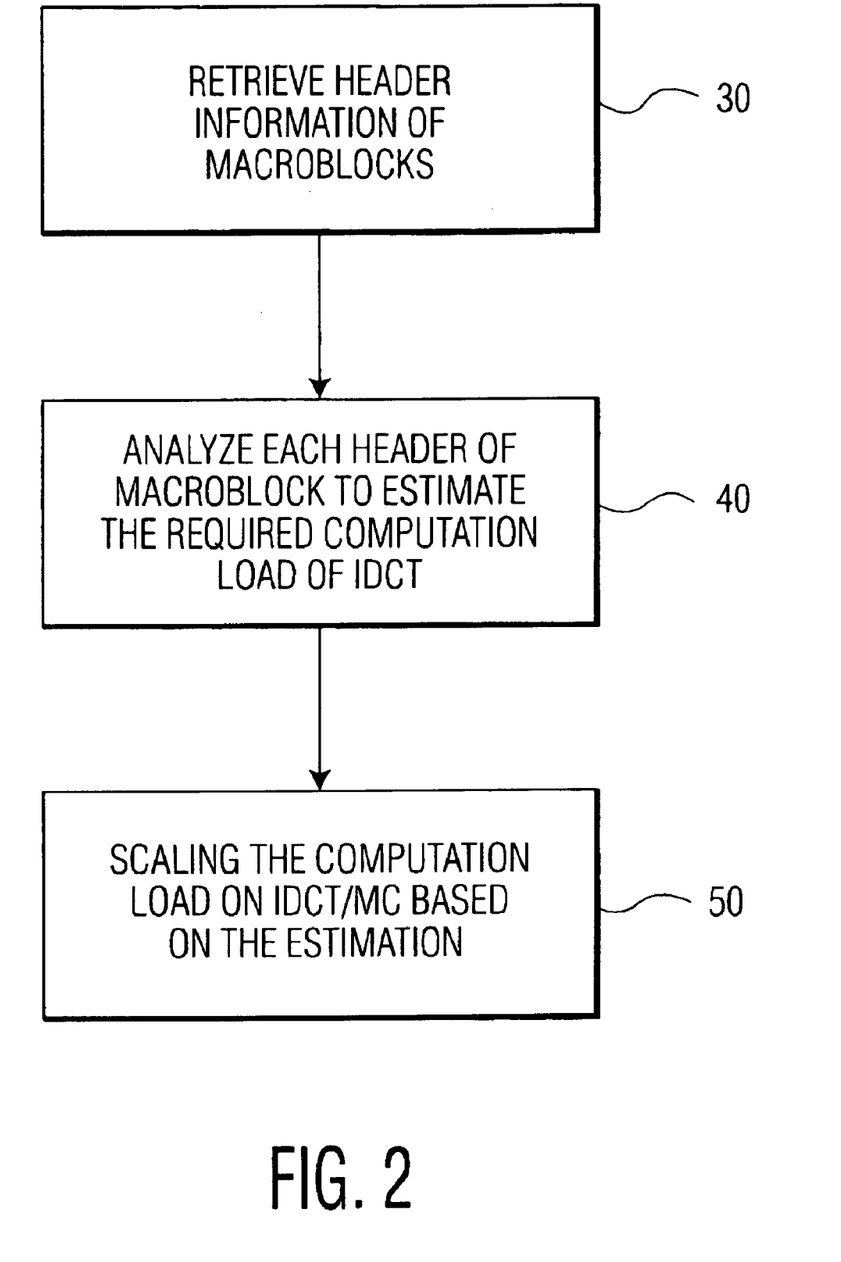
FIG. 2 is a flowchart depicting the operations steps within the processor of FIG. 1.

FIG. 2 illustrates the basic operation steps that enable to estimate and to adjust the computation load of the IDCT 16 and the MC24. To accomplish this, the present invention utilizes macroblock-type information to predict the computational overhead that may occur and to adaptively control the computing complexity of the IDCT 26 and/or the MC 24, so that a lesser computational burden is presented to the decoder 10. The complexity measurement is defined by the total number of machine cycles to run the software on a specific coprocessor. Accordingly, in block 30, the header information of macroblock is retrieved from the incoming signals received by the decoder 10. In block 40, the retrieved header information is analyzed to estimate the required computation load of the IDCT 16 and/or the MC24. In general, depending on the type of information being processed, the components of the decoder 10 is burdened by several tasks. At times when the process is performing fewer tasks and is less burdened, the computation load of the decoder will be reduced in the present invention by scaling the computation load of the IDCT 16 and/or the MC 24.

Figure 3:
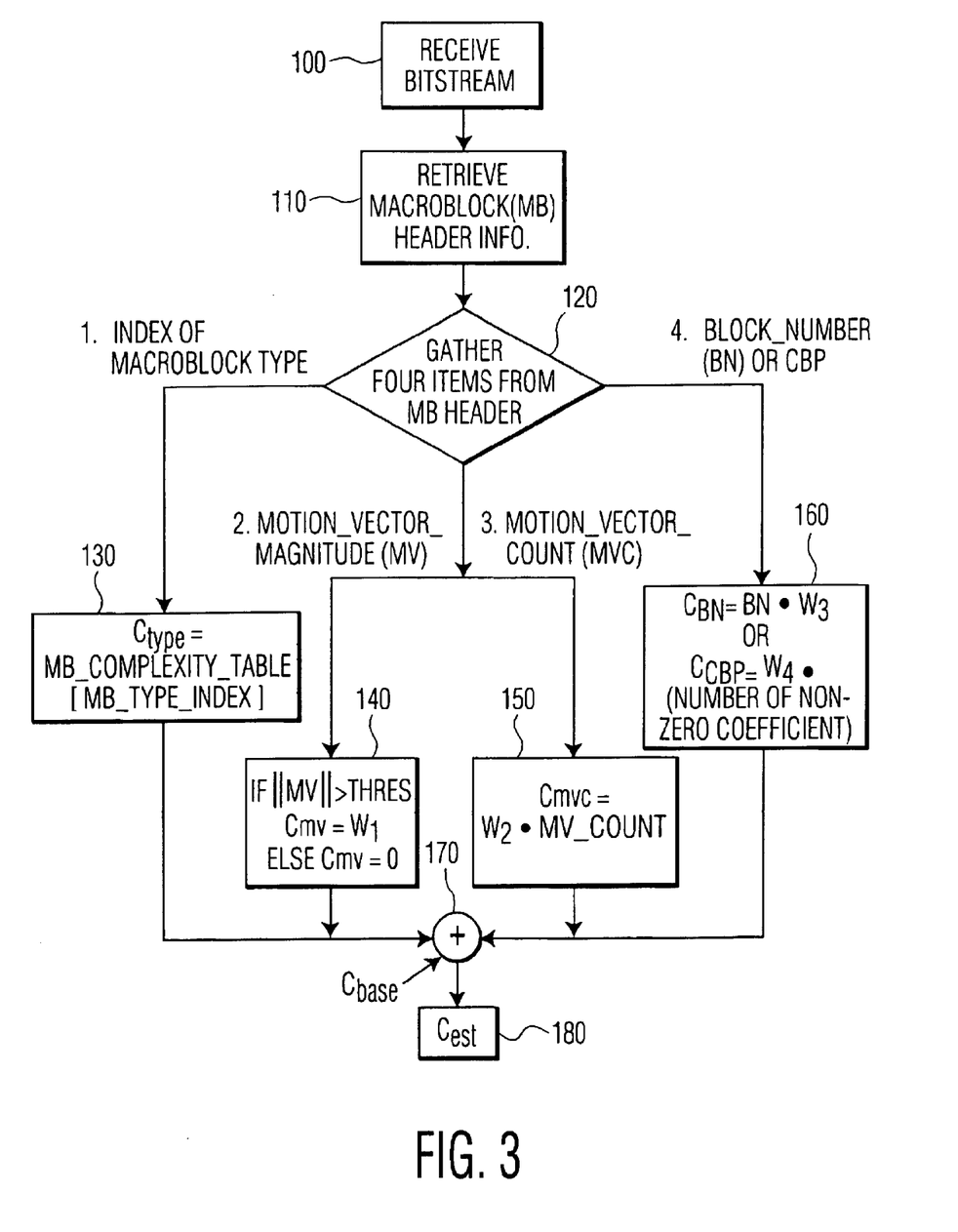
FIG. 3 is a flow chart illustrating the estimation of computation load of a processor according to the present invention.

Now, the provision of estimating the computation load to support dynamic prediction and scaling the decoding process according to the present invention will be explained in detailed description. The following flow chart of FIG. 3 shows the operation of a software embodiment of complexity estimator. This flow chart is generally applicable to a hardware embodiment as well.

Figure 4A:
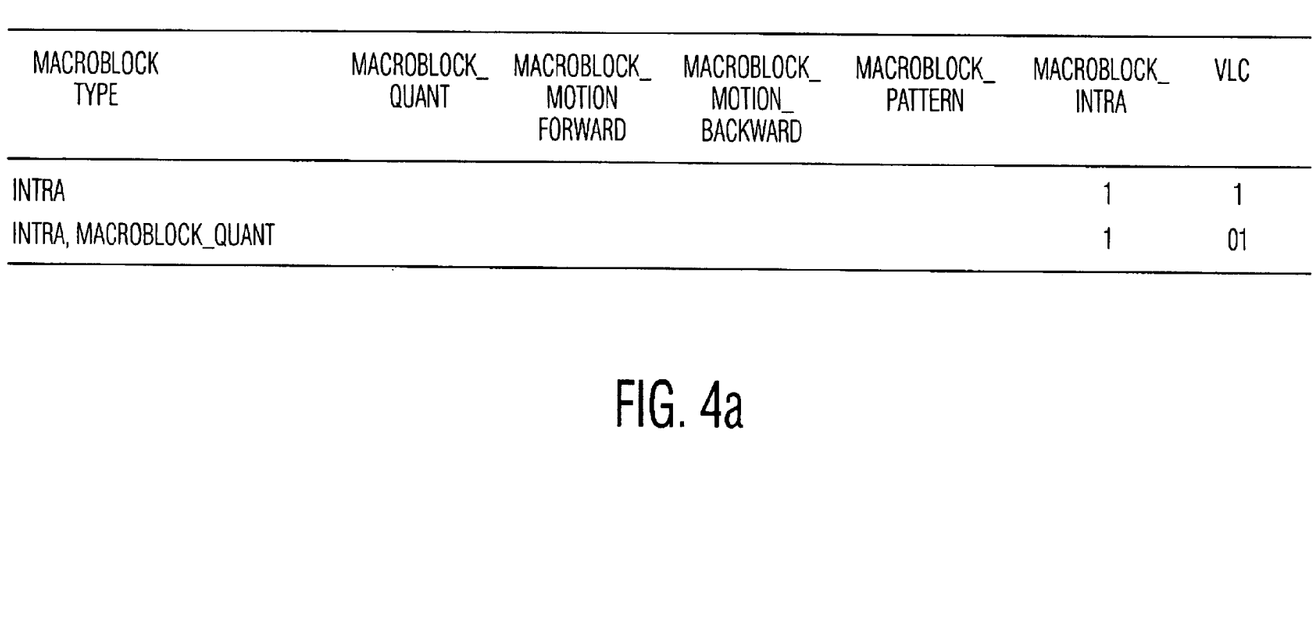
Figure 4B:
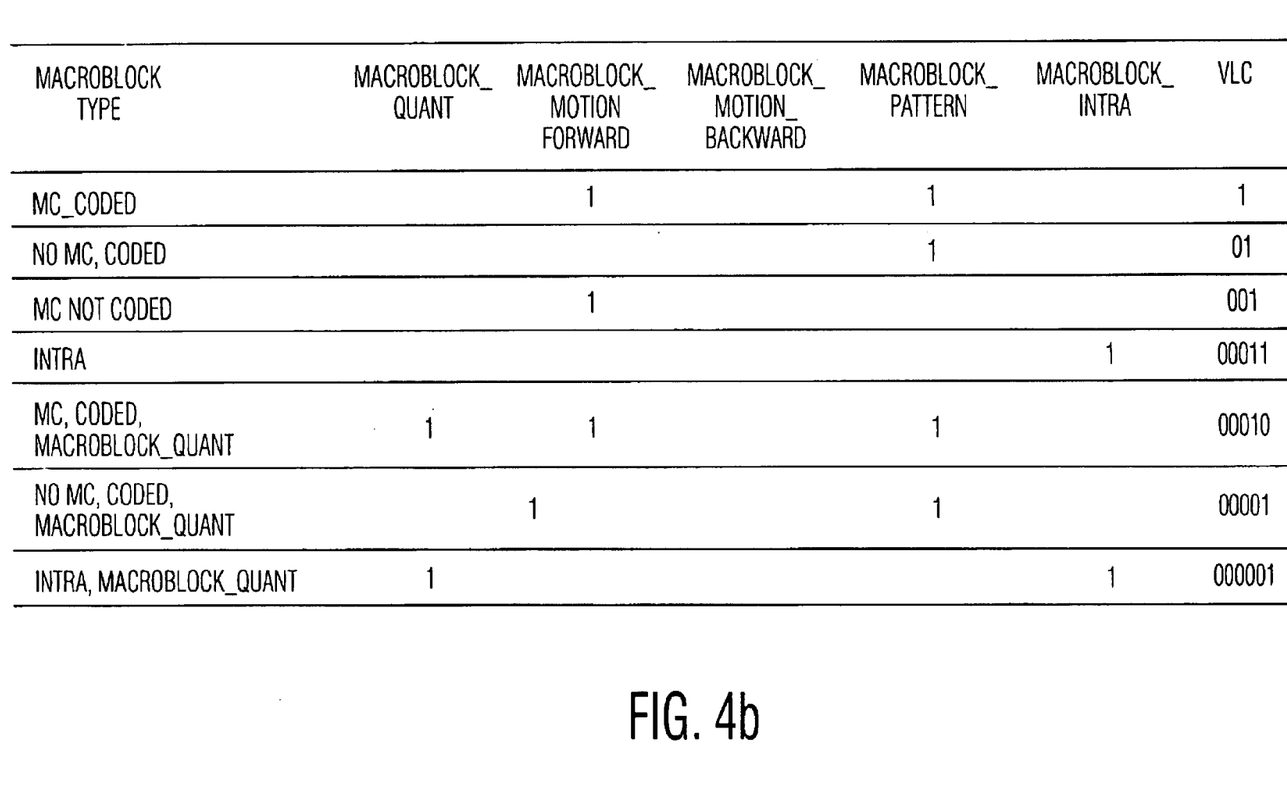
Figure 4C:
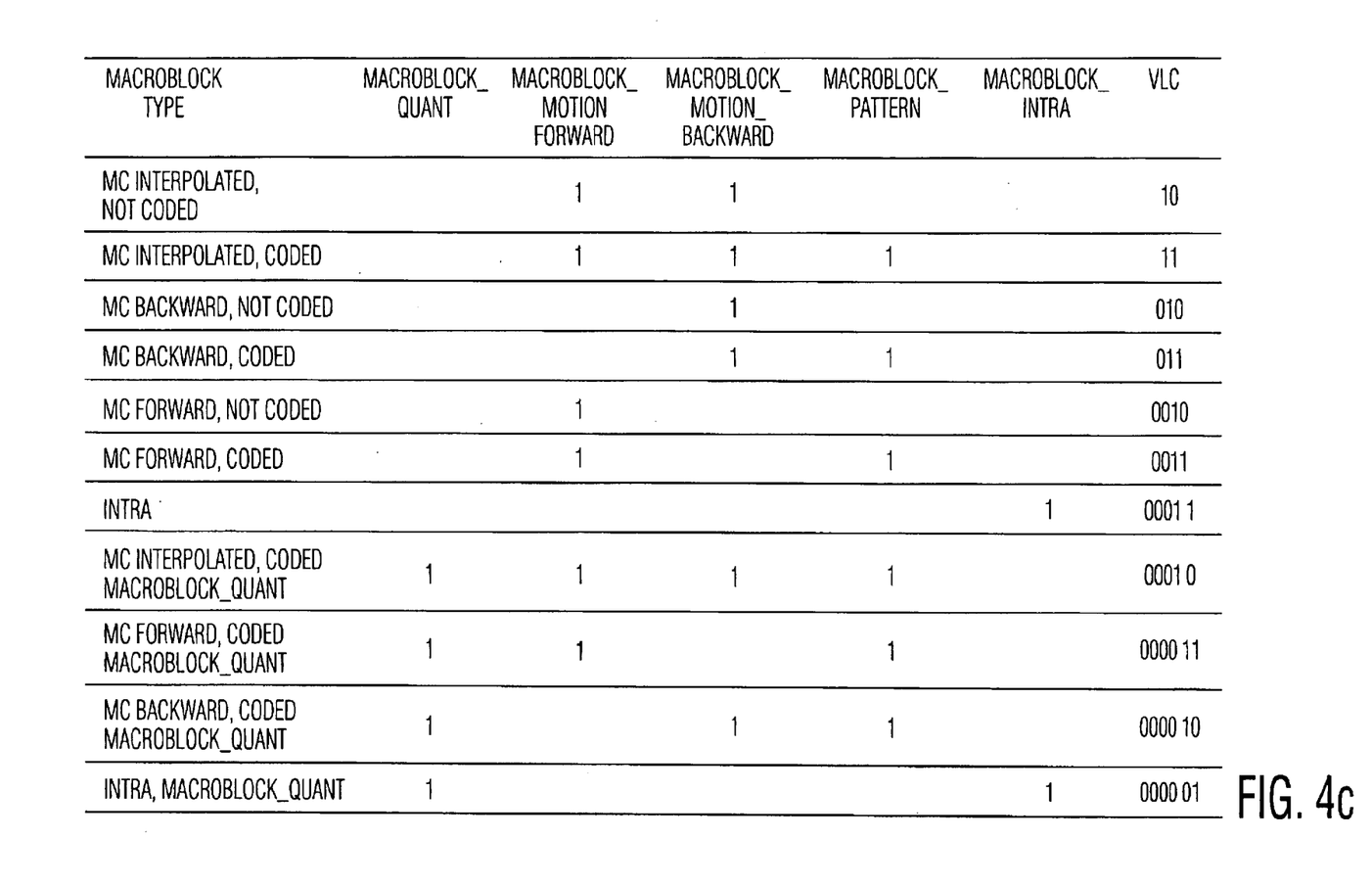
Figure 5:
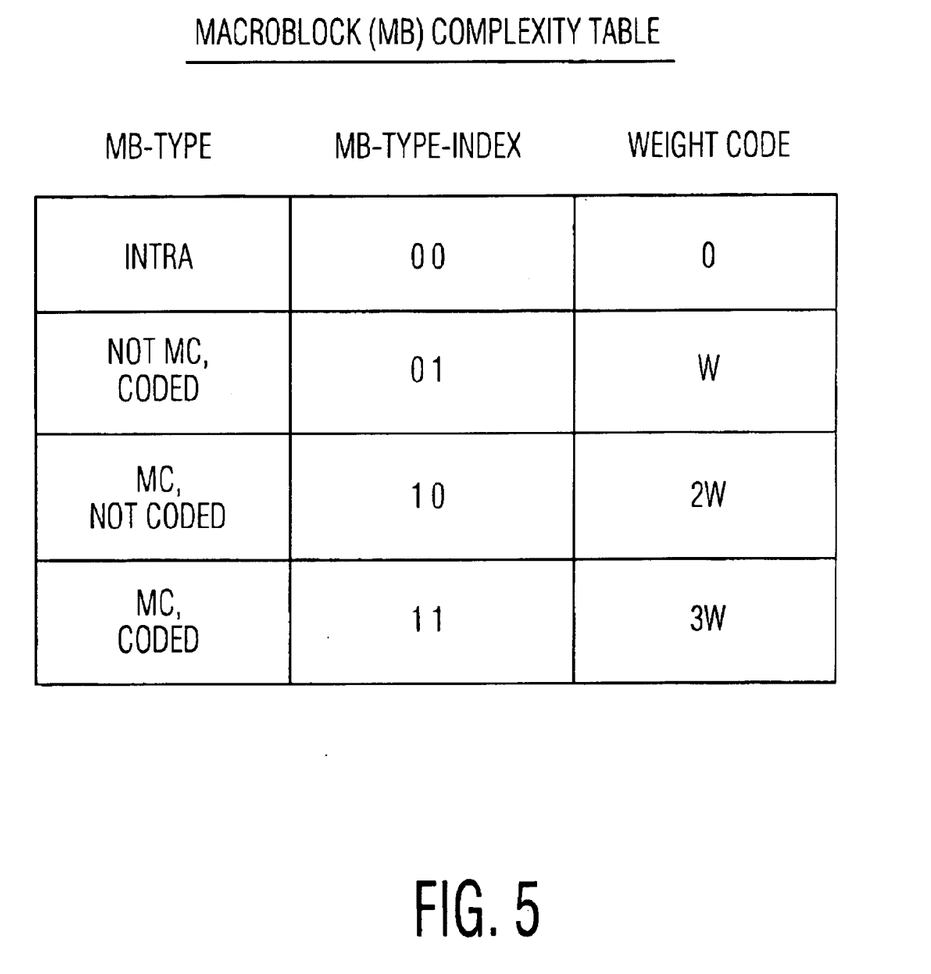
FIG. 5 illustrates a table showing different computation weight assigned to various types of header information according to the present invention; and, FIGS. 6 (a)–(b) illustrate an actual simulation of complexity estimation of a video sequence in accordance with the present invention.

As seen in FIG. 3, a stream of compressed video information is received by the inventive decoder 12 in step 100. In step 110, the header information of current macroblock is retrieved prior to executing the MPEG2 decoding operation. The format of macroblock-type information is shown in FIGS. 4(a)-(c). Upon receiving the header information, the complexity estimator 22 makes a determination of the performance capabilities of the decoder 12 in step 120. That is to say, the complexity estimator 22a determines different grades of performance for the IDCT 16 and the MC 24 based on the header information and the available computing resources of the decoder 10. To this end, four different parameters out of the VLD header are extracted in order to estimate the complexity. These four parameters are analyzed independently to assign varying computation weight as explained below.

In step 130, a different computation weight ($C_{type}$) is assigned to the inverse DCT 16 depending on the type of macroblock received by the decoder 10. Referring to FIG. 4, if macroblock_type=intra, the corresponding computation weight is assigned to zero as the intra coded macroblock only requires the computation by the IDCT 16, and not through the macroblock_type. If the current macroblock is not motion compensated but coded, the corresponding computation weight is W as the computation load involving looking up previous blocks and copying them to current blocks requires less computation than the motion compensated scenario. If the current macroblock is motion compensated but not coded, the corresponding computation weight is 2W. If the current macroblock is interpolate motion compensated and coded, the corresponding weight is 3W as the computation load is higher than any other type due to the requirement of retrieving forward vector(s) and backward vector(s).

In step 140, the motion vector magnitude derived from the header information is compared to a pre-set threshold value to determine whether different grades ($C_{mv}$) of performance for the IDCT 16 and MC 24 are required. In another word, for a large motion vector, the memory access and write time from the previous block to the current block is longer than that of a short motion vector. Hence, if the motion vector magnitude is greater than a threshold value, the computation load corresponds to $W_1$, otherwise, assigned to zero. As a consequence, significant computational resources can be saved by providing relative IDCT 16 or MC24 performance for macroblocks with motion vectors whose magnitude exceeds a predetermined threshold level, by scaling the CPU load of IDCT 16 and/or the MC 24 while maintaining optimal performance.

In step 150, the motion vector count retrieved from the header information is examined to determine whether different grades ($C_{mvc}$) of performance for the IDCT 16 and the MC 24 are required. Here, a different computation weight is assigned as the two-vector MC requires decoding algorithm to access two different memory areas, instead of one for the one-vector MC. That is, if the motion vector is a field-type vector, the estimated complexity is higher than that of a frame-type vector since the field-type vector count is two instead of one of that of the frame-type vector. Hence, the computation weight, $W_2$, is increased proportionally according to the count number detected in the header information.

In step 160, the number of non-zero DCT coefficients or block number of the coded block pattern (CBP) from the header information are examined to determine whether different grades ($C_{BN}/C_{CBP}$) of performance for the IDCT 16 and the MC 24 are required. That is, depending on the sparseness of DCT coefficients, the inventive MPEG decoder is able to tailor the IDCT computation load to a minimum. Thus, the computation load, $W_3$, is computed based on the number of non-zero DCT coefficients detected from the header information. Alternatively, the computation load, $W_4$, which is proportional to the CBP count may be utilized. The CBP count indicates how many blocks are being coded.

After retrieving those parameters from the stream and assigning them with a proper weight, it is now possible to accurately estimate the computational requirement of macroblock decoding. In step 170, the result of computation weight factors are aggregated, and an average minimum computation load ($C_{base}$) is added in step 170. Then, the complexity estimator 22 increase/reduce the IDCT computation and/or the motion compensation burdens based on the estimation load ($C_{est}$). Depending on the level of performance prediction detected from the macroblock header in step 180, the computation load of either the IDCT circuit 16 or the motion compensation circuit 24 is set to a relatively high level if the performance of processor is presently gauged to be relatively high, and conversely, the computation load is set to a relatively low level if the performance of the processor is gauged to be relatively low. That is, if the computation load estimated in step 180 based on the accumulated weight factors corresponds to 120 mega cycles per second and the available processing capability of the decoder 10 is limited to 100 mega cycles per second, the ratio between these two values (i.e., 100/120=80%) is used as the scale factor for the IDCT 16 computation and/or the MC 24 computation. Thus, for example, only 80% of the CPU load of IDCT 16 can be dedicated to process the incoming data of the decoder 10. In this way, both the IDCT 16 and/or the MC 24 can be selectively adjusted to scale down the computation load to avoid frame drop or unexpected results associated with exceeding the maximum CPU load of the decoder 10. It is noted that the amount of scaling the CPU loads of the components of the decoder 10 can be varied according to the predetermined criteria (or weight factor) set by an operator and the available process capabilities of the decoder.

As described above, the computation load can vary dynamically with changes in current system performance which occur as the system becomes loaded with tasks and then relieved of such tasks. Furthermore, it is noted that at the slice or frame level, one just needs to add macroblocks computation estimation together. Hence, the same computation or motion compensation can be achieved at the frame or slice level, by calculating an overall scale factor of the computation estimates of macroblock_type information within a frame or a slice.

Figure 6A:
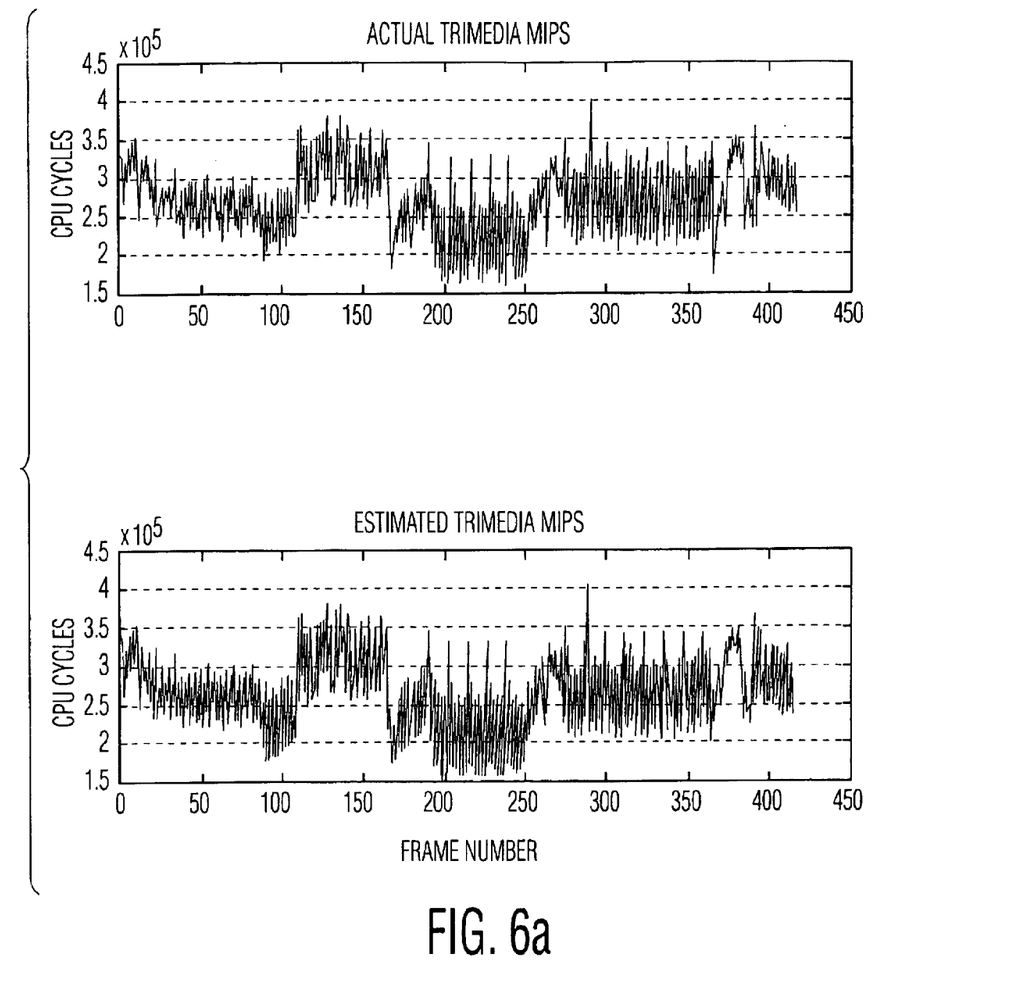
Figure 6B:
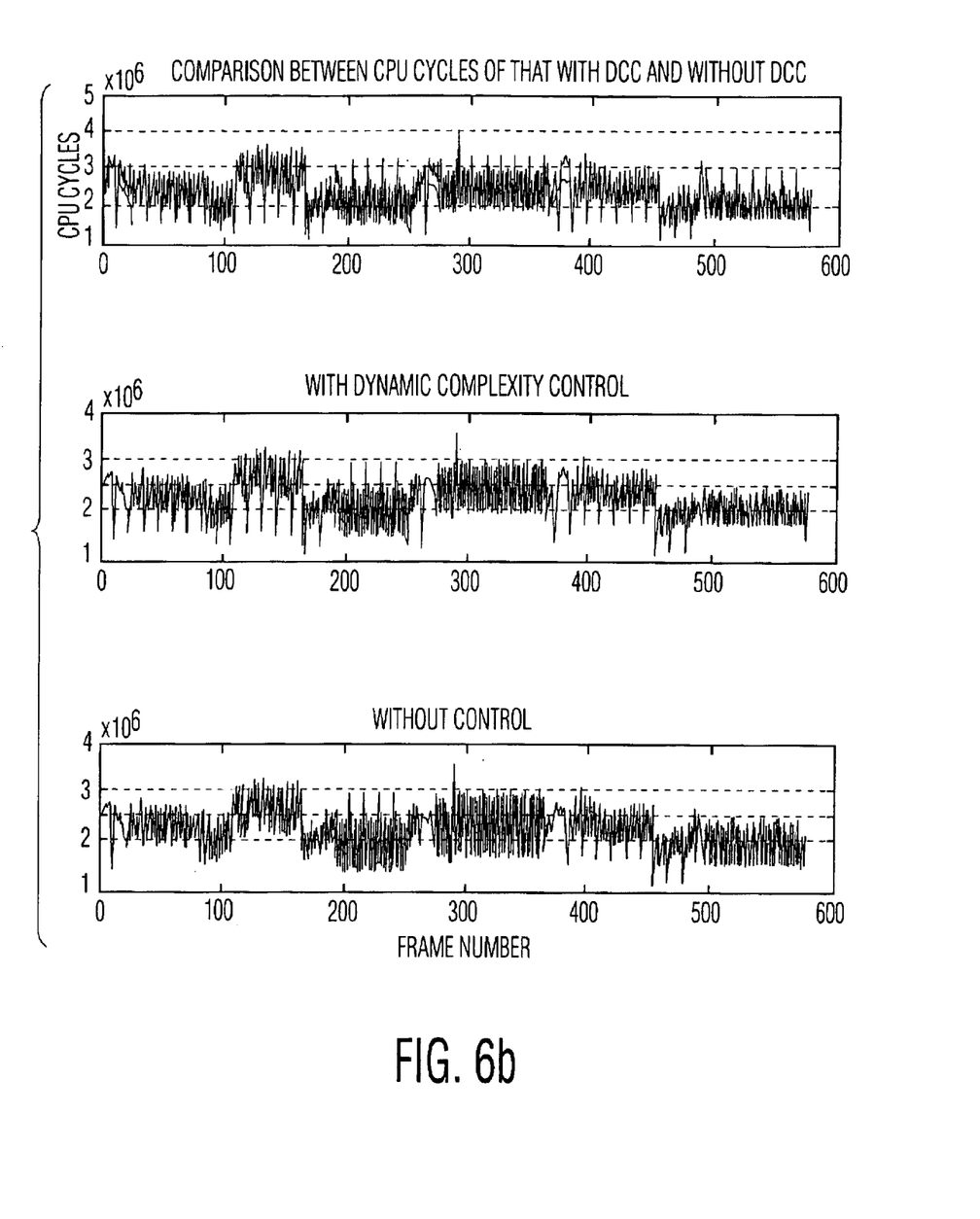

The result of complexity estimation of a video sequence (Molens.cod bitstream) is illustrated in FIGS. 6(a) and (b). As shown in both figures, the top graph represents the performance of actual TriMedia (Philips™) MPEG2 decoder and the bottom graph represents the estimation load according to the present invention. FIG. 6(a) represents a comparison between actual CPU cycles of decoding the Molens sequence on a TriMedia 1300 and the inventive estimated CPU cycles, where as FIG. 6(b) represents a comparison between the CPU cycles of non-DCC (dynamic complexity control) MPEG2 decoding of the Molens sequence and that of inventive DCC (dynamic complexity control) decoding. The result shows a correlation factor of about 0.97 between them.

The foregoing has disclosed a method of adaptively performing IDCT computation or motion compensation in a video decoder. The disclosed method advantageously reduces the processing requirements associated with decompression methodology. Accordingly, decompression efficiency is increased while not overly degrading the ultimate video image. Furthermore, while the preferred embodiments of the present invention have been illustrated and described, it will be understood by those skilled in the art that various changes and modifications may be made, and equivalents may be substituted for elements thereof without departing from the true scope of the present invention. Therefore, it is intended that the present invention not be limited to the particular embodiment disclosed as the best mode contemplated for carrying out the present invention, but that the present invention includes all embodiments falling within the scope of the appended claims.

What is claimed is:

1. An MPEG decoder for improving decoding efficiency by scaling the decoding of an encoded digital video signal, comprising:

means for decoding a compressed video data stream including a plurality of macroblocks, said decoding means being operative to output quantized data from said decoded data stream;

means for performing an inverse quantization operation on said quantized data;

means for performing an inverse discrete cosine transform (IDCT) of the output from said means for performing an inverse quantization operation;

means for extracting header information from said quantized data from said decoding means and for performing a prediction operation according to predetermined criteria, wherein said prediction operation defines a total computation load based on cumulative computation loads determined from header information macroblock-type, motion vector magnitude, motion vector count, non-zero discrete cosine transformer coefficients and a coded block pattern (CBP);

means for generating a motion compensated reference value based on said quantized data from said decoding means; and means for adding the output from said IDCT means and said motion generating means to produce motion compensated pictures.

2. The decoder of claim 1, further comprising means for storing the output of said adding means.

3. The decoder of claim 1, wherein said extracting means being operative to execute said prediction operation according to said extracted header information of the plurality of said macroblocks.

4. The decoder of claim 1, wherein said prediction operation defines the computation load of said IDCT means and said motion generating means.

5. The decoder of claim 1, wherein the computation load of said MPEG decoder is selectively adjusted by scaling said IDCT means and said motion generating means based on said prediction operation.

6. The decoder of claim 1, wherein said prediction operation is implemented using a processing unit and software which controls the operation of said processing unit.

7. A programmable video decoding system, comprising:

a variable length decoder (VLD) configured to receive and decode a stream of block-based data packets, said VLD being operative to output quantized data from said decoded data packets;

a complexity estimator configured to extract the header information from said block-based data packets and further configured to execute a video complexity algorithm based on said extracted header information, wherein said extracted header information includes a macroblock-type, a motion vector magnitude, a motion vector count, non-zero discrete cosine transformer (DCT) coefficients, and a coded block pattern (CBP)

number and is used to determine an associated computation load that combine to determine a total computation load;

an inverse quantizer coupled to receive the output of said variable length decoder to operatively inverse quantize the quantized data received from said variable length decoder;

an inverse discrete cosine transformer (IDCT) coupled to the output of said inverse quantizer for transforming the dequantizer data from frequency domain to spatial domain;

a motion compensator (MC) configured to receive motion vector data from said quantized data and to generate a reference signal; and an adder for receiving said reference signal and said spatial domain data from said IDCT to form motion compensated pictures.

8. The system of claim 7, further comprising a buffer configured to store the output of said adder.

9. The system of claim 7, wherein said complexity estimator being operative to executed said video complexity algorithms according to the header information of said decoded block-based data packets, and wherein the computation load of said decoding system is regulated by scaling said IDCT and said MC based on said video complexity algorithms.

10. The system of claim 9, wherein the computation load of said IDCT and said MC arc selectively adjusted according to said video complexity algorithm.

11. The system of claim 7, wherein said video complexity algorithm is implemented using a processing unit and software, which controls the operation of said processing unit.

12. A method for improving decoding efficiency of an encoded digital video signal employing an MPEG digital video decoder having a variable length code (VLC) decoder, an inverse quantizer (IQ), an inverse discrete cosine transformer (IDCT), a motion compensator (MC), and an estimator, said method comprising the steps of:

receiving a compressed video data stream at said VLC decoder and producing decoded data therefrom;

retrieving header information from said decoded data; calculating a total computation load ($C_{est}$) for said IDCT and said MC based on the classification of said header macroblock-type, motion vector magnitude, motion vector count, non-zero discrete cosine transformer coefficients and a coded block pattern (CBP) information by said estimator;

dequantizing said decoded data using said inverse quantizer (IQ) to generate dequantized, decoded data;

employing said IDCT for transforming said dequantized, decoded data from frequency domain to spatial domain based to said total computation load ($C_{est}$) to produce difference data;

employing said MC for generating a reference data of said encoded digital video signal based on said computation load; and combining said reference data and said difference data to produce motion compensation pictures.

13. The method of claim 12, further comprising the step of transmitting said total computation load ($C_{est}$) to said IDCT and said MC.

14. The method of claim 12, wherein the step of calculating said total computation load ($C_{est}$) further comprising the steps of:

determining a first computation loud ($C_{type}$) based on the macroblock of said retrieved header information;

determining a second computation load ($C_{mv}$) based on the motion magnitude of said retrieved header information;

determining a third computation load ($C_{mvc}$) based on the motion vector magnitude of said retrieved header information;

determining a fifth computation load ($C_{BN}$) based on the number of non-zero DCT coefficients of said retrieved header information;

determining a fifth computation load ($C_{CBP}$) based on the coded block pattern (CBP) of said retrieved header information; and combining said first, second, third, fourth computations loads, and an average computation load ($C_{base}$) to obtain said total computation load ($C_{est}$).

15. The method of claim 14, wherein the step of determining said first computation load ($C_{type}$) further comprising the steps of:

$C_{type}$=0 if said retrieved header information provides a set of intra-coded coefficient;

$C_{type}$=W if said retrieved header information provides a set of coded coefficient and non-motion compensated coefficient;

$C_{type}$=2W if said retrieved header information provides a set of motion compensated coefficient and non-coded coefficient; and $C_{type}$=3W if said retrieved header information provides a set of motion compensated coefficient and coded coefficient.

16. The method of claim 14, wherein the step of determining said second computation load ($C_{mv}$) further comprising the step of:

$C_{mv}$=W1 if said retrieved header information provides a motion vector magnitude which is greater than a predetermined threshold otherwise $C_{mv}$=0.

17. The method of claim 14, wherein the step of determining said third computation load ($C_{mvc}$) further comprising the step of:

$C_{mvc}$=$W_2$x motion vector count (MV-Count) if said retrieved header information provides said motion vector count.

18. The method of claim 14, wherein the step of determining said fourth computation load ($C_{BN}$) further comprising the step of:

$C_{BN}$=$W_3$x motion vector count (MV-Count) if said retrieved header information provides said motion vector count.

19. The method of claim 14, wherein the step of determining said fifth computation load ($C_{CBP}$) further comprising the step of:

$C_{CBP}$ =$W_4$x number of non-zero coefficient if said retrieved header information provides said non-zero coefficient.

20. A prediction method of improving decoding efficiency of an encoded data video signal employing an MPEG digital video decoding system having a variable length code (VLC) decoder, an inverse quantizer (IQ), an inverse discrete cosine transformer (IDCT), a motion compensator (MC), and an estimator, said method comprising the steps of:

decoding a compressed bitstream including a plurality of macroblocks to obtain a corresponding decoded macro block;

obtaining a header classification criteria from the header information of said decoded macroblock, said criteria representing a macroblock-type, a motion vector magnitude, a motion vector count, non-zero discrete cosine transformer (CDT) coefficients, and a coded block pattern (CBP, number;

employing said estimator for predicting a total computation load ($C_{est}$) according to the header information from said decoded macroblock and forwarding said total computation load ($C_{est}$) to said IDVCT and said MC; and adjusting the computation load of said IDCT and said MC according to said total computation load ($C_{est}$).

21. The method of claim 20, further comprising the step of decoding said decoded macroblock according to said total computation load ($C_{est}$), together with motion vector information received in said compressed bitstream.

22. The method of claim 20, wherein the step of predicting said total computation load ($C_{est}$) further comprising the steps of:

determining a first computation load ($C_{type}$) based on the macroblock of the header information of said decoded macroblock;

determining a second computation load ($C_{mv}$) based on the motion magnitude of the header information of said decoded macroblock;

determining a third computation load ($C_{mvc}$) based on the motion vector magnitude of the header information of said decoded macroblock;

determining a fourth computation loud ($C_{BN}$) based on the number of non-zero DCT coefficients of the header information of said decoded macroblock;

determining a fifth computation load ($C_{CBP}$) based on the coded block pattern (CBP) number of the header information of said decoded macroblock; and combining said first, second, third, fourth, fifth computation loads, and an average computation load ($C_{base}$) to obtain said total computation load ($C_{est}$).

23. The method of claim 22 wherein the step of determining said first computation load ($C_{type}$) further comprising the steps of:

$C_{type}$=0 if said retrieved header information provides a set of intra-coded coefficient;

$C_{type}$=W if said retrieved header information provides a set of coded coefficient and non-motion compensated coefficient;

$C_{type}$=2W if said retrieved header information provides a set of motion compensated coefficient and non-coded coefficient; and $C_{type}$=3W if said retrieved header information provides a set of motion compensated coefficient and coded coefficient.

24. The method of claim 22, wherein the step of determining said second computation load ($C_{mv}$) further comprising the step of;

$C_{mv}$=$W_1$ if said retrieved header information provides a motion vector magnitude which is greater than a predetermined threshold otherwise $C_{mv}$=0.

25. The method of claim 22, wherein the step of determining said third computation load ($C_{mvc}$) further comprising the step of:

$C_{mvc}$=$W_2$x motion vector count (MV-Count) if said retrieved header information provides said motion vector count.

26. The method of claim 22, wherein the step of determining said fourth computation load ($C_{BN}$) further comprising the step of:

$C_{BN}$=$W_3$ x motion vector count (MV-Count) if said retrieved header information provides said motion vector count.

27. The method of claim 22, wherein the step of determining said fifth computation load ($C_{CBP}$) further comprising the step of:

$C_{CBP}$=$W_4$ x number of non-zero coefficient if said retrieved header information provides said non-zero coefficient.

* * * * *